J. Heuermann,
Drinking Vessel Cover.
No. 90,539. Patented May 25, 1869.
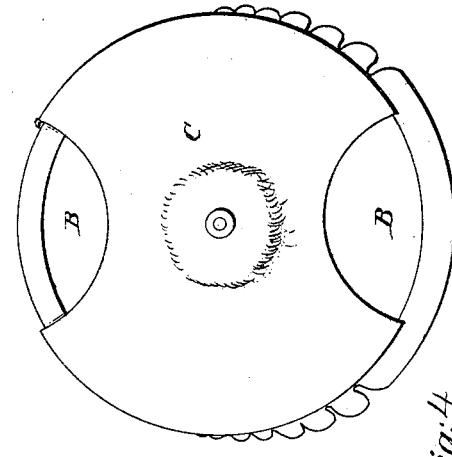
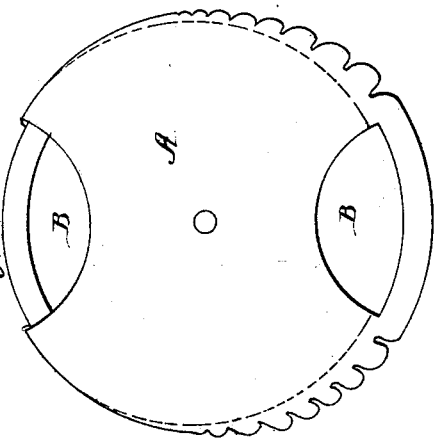
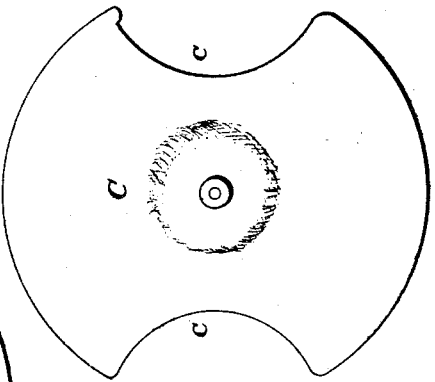
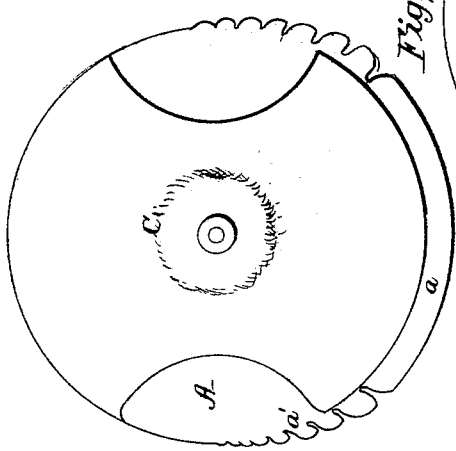
Witnesses:
Henry Krack
H. W. Anthun
Inventor:
John Heuermann

United States Patent Office.

JOHN HEUERMANN, OF DAVENPORT, IOWA.

Letters Patent No. 90,539, dated May 25, 1869.

IMPROVED COVER FOR DRINKING-VESSELS.

The Schedule referred to in these Letters Patent and making part of the same.

*To all whom it may concern:*

Be it known that I, JOHN HEUERMANN, of Davenport, in the county of Scott, and State of Iowa, have invented a new and useful Improvement in Covers for Drinking-Vessels; and I do hereby declare that the following is a full and exact description of the same, reference being had to the accompanying drawings, and to the letters of reference marked thereon.

This invention relates to an improved device for covering drinking-vessels; and consists mainly in the employment of two circular metal covers, pivoted together, the lower of which is attached to the vessel, while the other slides freely thereon.

Both covers are provided with orifices of like shape, which, when brought together, form a continuous orifice, but when their relative positions are changed, close the communication with the vessel, as will hereinafter be more fully described.

In the drawings—

Figure 1 is a perspective view of my invention, closed.

Figure 2 is a perspective view of my invention, opened.

Figures 3 and 4 are views of the parts detached.

To enable others skilled in the art to make and use my invention, I will now proceed to describe fully its construction and operation.

A represents a circular metal cover, provided with a flange, $a$.

Portions of the flange $a$ are serrated, as shown at $a'$.

B B represent orifices, of any suitable form, which are cut in the cover near the flange.

C represents an additional cover, which is pivoted, at its centre, to the cover A, and is of similar shape, and is provided with corresponding orifices $c\ c$.

The cover A is attached to any suitable vessel, by means of the flange $a$, and, if desired to attach the same permanently, the serrated portions $a'$ are bent inward, and firmly grasp the edges of the vessel.

When the device is in position for drinking, the cover C is turned in such manner as to bring the orifices $c$ over the orifices B, thus forming a communication with the inside of the vessel. When not in use, the cover may be so turned as to close the orifices.

This invention will be found particularly useful in imbibing those beverages which have lumps of ice floating thereon, which, it is well known, are somewhat difficult to keep from falling on the face, when the vessel is nearly drained.

Its chief point of utility and convenience, however, is in the protection it affords the moustache, which, it is unnecessary to state, is often a great inconvenience in drinking, which is effectually obviated by this device, as the inner edge of the orifice is made of such shape to fit the upper lip, and the liquid cannot, by any means, come in contact with the moustache.

Another advantage also is, that the vessel may be closed, and its contents be protected when it is not in immediate use.

Having thus fully described my invention,

What I claim as new, and desire to secure by Letters Patent, is—

The cover described, consisting substantially of the cover A, serrated flange $a\ a'$, orifices B, with the cover C, and its orifices $c\ c$, substantially as described.

This specification signed and witnessed, this 27th day of April, 1869.

JOHN HEUERMANN.

Witnesses:
HENRY TRUACK,
F. W. ANTHEEN.